United States Patent [19]
Kawai

[11] Patent Number: 5,028,833
[45] Date of Patent: Jul. 2, 1991

[54] ULTRASONIC MOTOR

[75] Inventor: Sumio Kawai, Hachioji, Japan

[73] Assignee: Olympus Optical Co., Ltd., Japan

[21] Appl. No.: 523,665

[22] Filed: May 15, 1990

[30] Foreign Application Priority Data

May 30, 1989 [JP] Japan ................................. 1-137636

[51] Int. Cl.$^5$ .......................................... H01L 41/08
[52] U.S. Cl. ................................................. 310/323
[58] Field of Search ................................. 310/323, 328

[56] References Cited

U.S. PATENT DOCUMENTS

| 4,692,650 | 9/1987 | Okumura et al. | 310/323 |
| 4,692,651 | 9/1987 | Hiramatsu et al. | 310/328 X |
| 4,743,791 | 5/1988 | Kawai | 310/328 X |
| 4,771,203 | 9/1988 | Mukohjima et al. | 310/323 |
| 4,793,689 | 12/1988 | Aoyagi et al. | 310/323 |

Primary Examiner—Mark O. Budd
Attorney, Agent, or Firm—Louis Weinstein

[57] ABSTRACT

An ultrasonic motor, comprises an annular stator including an elastic member and piezo-electric elements secured to said elastic member which generate a travelling wave on the surface of the elastic member by being applied with high frequency voltages; and a rotor which is in pressure-contact with the elastic member and is driven to be rotated with respect to said stator by the travelling wave. The rotor includes a cylindrical main body and a thin radial flange integrally secured to the periphery of the rotor main body at one end of the main body facing the stator, and a cylindrical vibration portion secured to a periphery of the flange having a diameter different from that of the rotor main body. The vibration portion extends in a direction which is the same as the vibration direction of the travelling wave. The rotor satisfies the following relation $5 < (h/t) < 15$ wherein t designates the thickness of the flange in a direction of rotational axis and h designates the height of the vibration portion in a direction of vibration of the travelling wave.

26 Claims, 5 Drawing Sheets

PRIOR ART

ULTRASONIC MOTOR

FIELD OF THE INVENTION

The present invention relates to an ultrasonic motor, and in particular to a structure of a rotor in the ultrasonic motor.

BACKGROUND OF THE INVENTION

An ultrasonic motor in which an annular and disc-like rotor is brought into pressure-contact with the surface of an oscillator (stator) including an annular or disc-like bimorph which is excited to generate a travelling flexing wave so that the rotor is rotated has recently been proposed and some type of such ultrasonic motors have been already put into market.

However, it is very hard to form an ultrasonic motor which is high in efficiency and can be stably rotated and generates no audible noise. That is, in order to efficiently convert the oscillating energy generated by the oscillator which is a driving source of the ultrasonic motor into a rotational movement of a rotor, the following requirements should be satisfied.

Firstly, leakage of the vibration generated at the stator through a support of the vibrator to the outside should be prevented. However, this problem can be solved by adopting a supporting structure disclosed in the Japanese Patent Application Sho/63-50224 filed by the present assignee.

Secondly, it is necessary to provide a rotor structure in which the loss of the vibration energy of a stator due to generation of a vibration mode which will not contribute to the rotation of the rotor is prevented.

Figure 14:
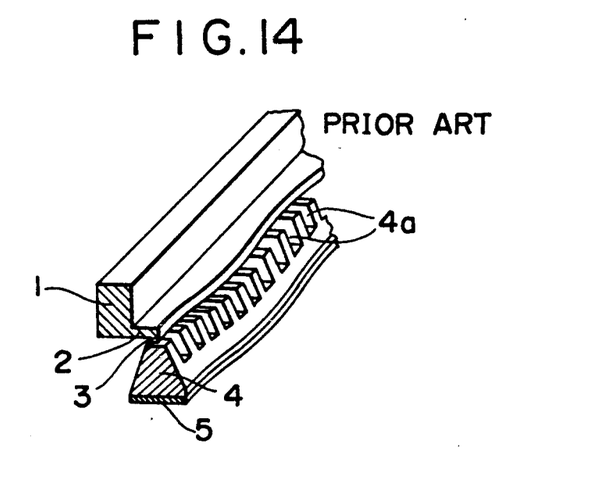
FIG. 14 is a perspective view showing an essential part of a conventional ultrasonic motor.

Thirdly, it is necessary to form such a motor in such a way that the vibration component of the vibration generated at the stator in a rotor driving direction is efficiently transmitted to the rotor and the vibration components in a direction normal to the rotor driving direction will not be impeded. Japanese Unexamined Patent Publication Sho/63-174581 discloses a rotor structure which satisfies the second and third requirements. As shown in FIG. 14, in detail, the width of a contact portion 3 of a rotor 1 which is in contact with a main body of a stator 4 is made as narrow as possible in this rotor structure. A portion which causes a contact portion 3 of the rotor 1 to pressure-contact with the stator 4 comprises a thin-walled flange 2.

However, unless the radial width of the contact portion 3 is as narrow as possible and the thickness of the contact portion 3 is substantially as thin as the flange 2 in the prior structure as shown in FIG. 14, the flexing vibration causes the contact portion to generate a vibration which will not contribute the rotation of the rotor. The vibration will not be dampened at the contact portion 3 and the flange portion 2. The vibration of the stator main body 4 is transmitted to the rotor 1 so that the vibration of the stator main body 4 is leaked to the outside via the rotor 1. Since a true contact area between the contact portion 3 and the rotor surface on driving of the ultrasonic motor is proportional to the width of the contact portion 3, a sufficiently large contact area can not be formed. Accordingly a large load is locally imposed upon the contact area between the contact portion 3 and the rotor, resulting in a remarkable wear at the contact area. Therefore, the lifetime of the ultrasonic motor is short even when tungsten carbide or hard alumite etc. having an excellent wear resistance is used for the contact surface.

Furthermore, it is hard to machine the thin-walled contact portion 3 at a high precision. As the flatness of the contact portion is insufficient, the ultrasonic motor will not rotate in a stable manner and in an extreme case, it will not rotate at all.

SUMMARY OF THE INVENTION

Accordingly, it is an object of the present invention to provide a compact ultrasonic motor which overcomes the drawbacks of the prior art and is high in efficiency and stable and long in lifetime and easy to fabricate.

In an aspect of the present invention there is provided an ultrasonic motor comprising: an annular stator including an elastic member and piezo-electric elements secured to said elastic member which generates a travelling wave on the surface of the elastic member by being applied with high frequency voltages: and a rotor which is in pressure-contact with the elastic member and is driven to be rotated with respect to said stator by virtue of the travelling wave, said rotor including a cylindrical main body and a flange integrally secured to the periphery of the rotor main body at one end of the main body opposing the stator, and a cylindrical vibration portion secured to an end face of the flange and having a diameter different from that of the rotor main body, said vibration portion extending in a direction which is the same as the vibration direction of the travelling wave, said rotor satisfying the following relation: $5 < (h/t) < 15$ wherein t designates the thickness of the flange in a direction of the rotational axis, and h designates the height of the vibration portion in a direction of the vibration of the travelling wave.

In another aspect of the present invention, there is provided an ultrasonic motor comprising: an annular stator including an elastic member and piezo-electric elements secured to said elastic member which generates a travelling wave on the surface of the elastic member by being applied with high frequency voltages; and a rotor which is in pressure-contact with the elastic member and is driven to be rotated with respect to said stator by virtue of the travelling wave, said rotor including a cylindrical main body and a thin flange integrally secured to the periphery of the rotor main body at one end of the main body facing the stator, and a cylindrical vibration portion secured to an end face of the flange and having a diameter different from that of the rotor main body, said vibration portion extending in a direction which is the same as the vibration direction of the travelling wave, said rotor satisfying the following relation, $1 \leq (b/t) \leq 3.5$ wherein t designates the thickness of the flange in a direction of the rotational axis and b designates the width of the vibration portion in a radial direction.

In a further aspect of the present invention, there is provided an ultrasonic motor comprising: an annular stator including an elastic member and piezo-electric elements secured to said elastic member which generates a travelling wave on the surface of the elastic member by being applied with high frequency voltages; and a rotor including two cylindrical members having different diameters and a flange which links said two cylindrical members with each other, said rotor being driven to be rotated with respect to the stator by causing any one of two cylinders to contact with the stator at the one end thereof, the spring constant of the flange of the rotor kf (kg/mm) being represented by the formula $kf=1.43N+3.5$ wherein N (kg) represents a biasing force of the rotor applied upon the stator.

In a further aspect of the present invention, there is provided an ultrasonic motor comprising: an annular stator including an elastic member and piezo-electric elements secured to said elastic member which generates a travelling wave on the surface of the elastic member by being applied with high frequency voltages; and a rotor which is in pressure contact with the surface of the elastic member and is driven to be rotated with respect to the stator by the travelling wave, said rotor comprising a cylindrical main body, a thin-walled flange integrally secured to the periphery of the main body at an end face thereof facing the stator, said flange being formed with a plurality of holes in an spaced manner, and a cylindrical vibration portion integrally secured to the end face of the flange, which extends in a direction of vibration of the travelling wave.

In a further aspect of the present invention, there is provided a lens-barrel assembly which is driven by an ultrasonic motor, comprising: a lens holding frame for holding a lens and having a member driven by a cam driving member; a fixed frame into which said lens holding frame is movably fitted in a direction of an optical axis and having an oblique cam groove into which said driving member is fitted for cam-driving the lens holding frame; an annular stator of the ultrasonic motor secured to the fixed frame including an elastic member and piezo-electric elements secured to said elastic member which generates a travelling wave on the surface of the elastic member by being applied with high frequency voltages; a rotor of the ultrasonic motor rotatably fitted to the fixed frame, including a cylindrical main body and a flange integrally secured to the periphery of the rotor main body at one end of the main body facing the stator and a vibration portion secured to a periphery of the flange and extending in a vibration direction of the travelling wave and having a straight cam groove extending along the optical axis into which the driven member is fitted for cam-driving the lens holding frame; and means for causing the rotor to rotate around the optical axis and to pressure-contact with the stator along the optical axis.

Since the rigidity of the vibration portion of the rotor may be preset high, machining of the rotor is easy and the contact surface of the rotor which will be in contact therewith may be formed with a high accuracy so that the rotation of the motor is stable.

The width of the contact between the rotor and the stator may be made wider almost independently of the design of a vibration portion with respect to a rotor and the lifetime of the motor will be remarkably extended.

A high efficient and compact motor can be provided by forming the vibration portion of the rotor so that the thickness of the wall and the width of the flange will be minimum.

DETAILED DESCRIPTION OF THE PREFERRED EMBODIMENTS

Figure 1:
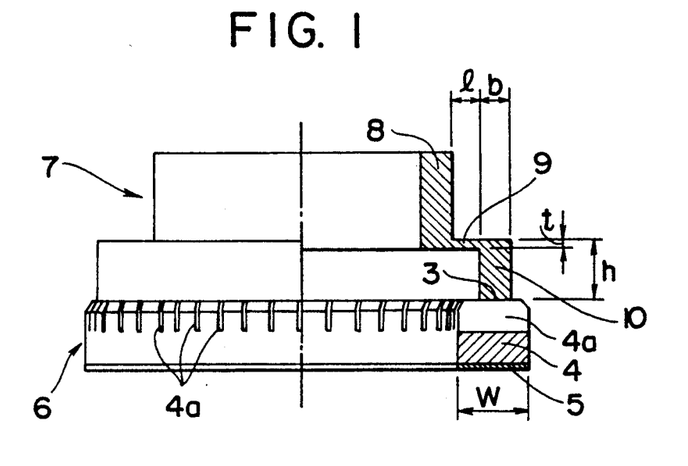
FIG. 1 is a side view, the right half of which is a sectional view showing a first embodiment of an ultrasonic motor of the present invention.

Referring now to FIG. 1, there is shown a first embodiment of an ultrasonic motor. A stator 6 comprises a stator main body 4 which is made of an annular elastic member and a piezo-electric ceramics 5 secured to the outer end face lower side in the drawing) of the stator main body 4. When high frequency voltages are applied to the piezo-electric ceramics 5, a travelling flexing wave is generated at the stator 6. The rotor 7 which is in pressure-contact with a contact portion 3 of the stator 6 will be driven to be rotated around the central axis of the motor by the travelling flexing wave. The contact portion 3 is made narrower by forming a multiplicity of slits 4a on the inner (upper in the drawing) end face of the stator main body 4.

The rotor 7 comprises a rotor main body B which is formed into a short cylinder, a thin-walled flange which extends integrally from the periphery of the end face of the main body 8 in a radial direction, and a vibration portion 10 which is cylindrically formed and extends integrally from the outer peripheral edge of the flange 9 in a vibration direction of the travelling wave. The vibration portion 10 is in pressure contact with the contact portion 3 of the stator 6 at the external end face (the lower side in the drawing).

Since the ease of flexing of the flange 9 and the vibration portion 10 is proportional to a flexural rigidity $E \cdot I$ and $Ef \cdot IF$ (wherein Ef and E depicts the longitudinal modulus of the flange 9 and the vibration portion 10, respectively, and $If=lt^3/12$ and $I=bh^3/12$ represents the moment of inertia of areas of the flange 9 and the vibration portion, respectively), if it is assumed that $5 < b/t$. When $E = Ef$ and $b = 1$, we will have a relation $EI/(Ef \cdot If) > 125$ wherein l designates the length of the flange 9 and h designates the height of the vibration portion.

Figure 2:
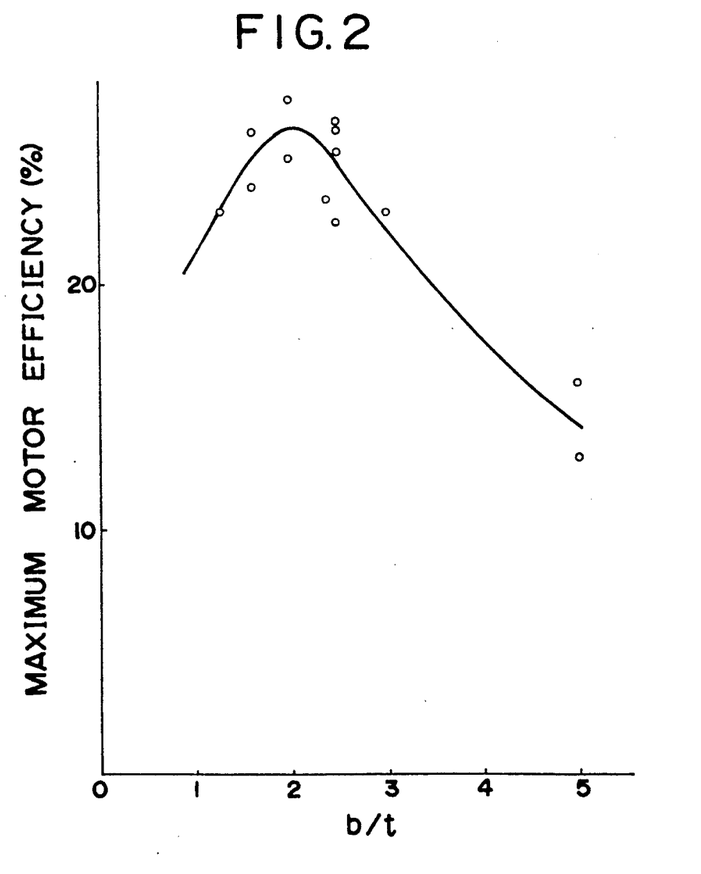
FIG. 2 is a graph showing the relation between a ratio b/t wherein b designates the width of a contact portion of a rotor in contact with a stator and t designates the thickness of a flange of the rotor and the efficiently of the motor.

Accordingly, if $h/t > 5$, the flange 9 is readily flexed while the vibration portion 10 is almost completely a rigid body. Therefore, the vibration of the stator 6 can be transmitted to the vibration portion 10, but the vibration will be dampened from the flange 9 to the rotor main body 8 so that transmission of the vibration from the flange 9 to the rotor main body 8 is difficult, resulting in a minimum loss of vibration energy. If $h/t > 15$, dumping of the vibration of the flange 9 is sufficient while an unwanted vibration will occur at the vibration portion 10 when the vibration of the stator 6 is transmitted to the vibration portion 10, resulting in a low motor efficiency (refer to FIG. 6). However, when $b \simeq t$ wherein b designates the thickness of a main body or extension of the vibration portion 10 which extends from the flange 9, the rigidity of the vibration portion 10 will be lowered and an unwanted flexing vibration in a radial direction will readily occur at the vibration portion and a vibrational component which will not contribute to the rotation of the rotor 7 will occur. Accordingly, the efficiency of the motor will be lowered (refer to FIG. 2). On the other hand, when $b \geq 3.5t$, the mass and the rigidity of the vibration portion 10 will be increased and the vibration energy which is transmitted from the stator 6 to the vibration portion will be increased so that the vibration which will not contribute to the motor rotation will occur at the vibration portion, resulting in lowering of the motor efficiency (refer to FIG. 2). Accordingly, the motor efficiency will become maximum when the ratio of t to b assumes an appropriate value. In the present invention, it is apparent from FIG. 2 that the motor efficiency becomes maximum around $b/t = 2$ and when $1 \leq b/t \leq 3.5$, a motor efficiency of less than 20% can be assured so that a motor can output a practical power.

An effective contact area between the rotor and the stator may be made larger and a high wear resistant and stable contact surfaces of the rotor and the stator may be obtained since the width of the contact portion of the vibration portion 10 which is in contact with the stator may be sufficiently large. Therefore, a stable ultrasonic motor having an extended lifetime may be fabricated. Since the vibration portion 10 is almost a rigid body, an appropriate high fabrication precision of the contact surface which is in contact with the stator can be assured by the usual machining working and the contact surface will not irregularly wave due to the vibration of the stator 6. Since the motor is formed so that the rigidity of the flange 9 is low while the rigidity of the vibration 10 is high and the resonant frequency f of the vibration portion 10 is higher than the resonant frequency fs of the stator 6, an unwanted vibration which will not contribute to the rotor rotation will not be generated at the vibration portion 10 of the rotor 7 and the contact interface between the stator 6 and the rotor 7 will be kept at a stable state.

Accordingly, the rotor 7 will rotate stably and an unwanted slipping between the rotor and the stator will not occur and an uncomfortable high frequency audible noise will not be generated. It is preferable that the thickness of the flange 9 be as thin as possible in order to provide a compact rotor 7 while the flange can not be machined at a high precision unless the minimum thickness is equal to or larger than 0.1 mm. Considering the output of the ultrasonic motor including a stator 6 having an outer diameter of about 20 mm to 80 mm, if the thickness t is preset at about 0.5 mm at maximum, a rotor which provides a high efficient motor could be designed and the rotor may be minimized in size. That is, if the thickness t of the flange 9 is made so that $0.1 \text{ mm} \leq t \leq 0.5 \text{ mm}$, a compact rotor which provides a high efficient motor may be made.

Figure 3:
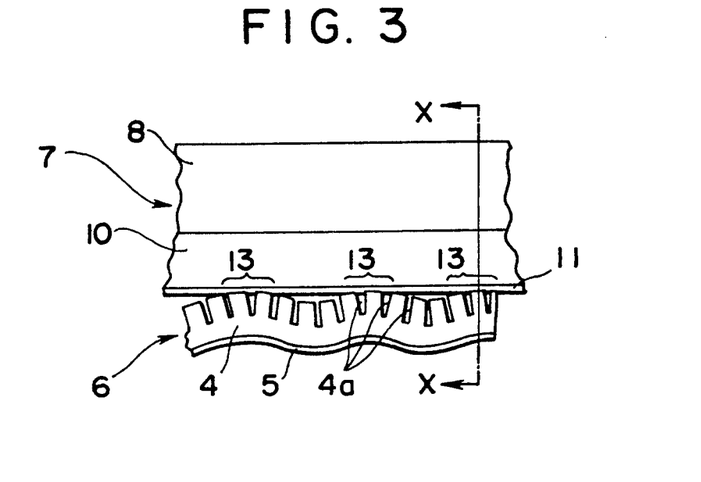
FIG. 3 is an enlarged detailed side view showing a second embodiment of the present invention.
Figure 4:
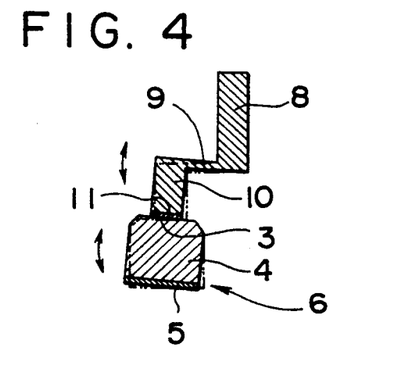
FIG. 4 is a sectional view taken along a line X—X in FIG. 3.

Referring now to FIGS. 3 and 4, there is shown a main part of a second embodiment of the present invention. The second embodiment is identical with the first embodiment except that a slider 11 is bonded to the surface of the vibration portion 10 of the rotor 7 which is in pressure contact with the contact portion 3 of the stator 6. Accordingly, the contact area 13 between the rotor 7 and the stator 6 is made wider as shown in FIG. 3 so that the lifetime of the motor is remarkably improved. An experiment shows that a motor of the second embodiment exhibits a lifetime not less than five hundred thousand rotations.

The slider 11 is made of a sheet of a heat resistant resin in which polytetrafluoroethylene is incorporated in an aromatic polyester. The slider 11 is bonded to the rotor made of A5056 aluminum with a polyimide resin. If the thickness of the slider 11 is in the order 0.1–0.3 mm, an optimum area of the contact area 13 may be preset for an ultrasonic motor in which the rotor biasing force is 0.5–5 kg.

The wider contact area 13 provides an extended period of lifetime. When the contact area 13 becomes excessively wider, the slider will not only contact with the peak of the travelling wave, but also contact with the root of the travelling wave, resulting in lowering of the motor efficiency. Therefore, it is necessary to select an appropriate slider material to provide an appropriate contact area for a biasing force of the rotor 7. It is deemed that the above-mentioned heat-resistant resin sheet is optimal. Other materials having a heat-resistance and an elastic modulus in compression of $0.7 \times 10^4 - 1.3 \times 10^4 \text{ kg/cm}^2$ including polyimide, polyamide, phenols and the like are also preferable. It is apparent from the FIG. 4 showing the section taken along a line X—X in FIG. 3 that the contact area 13 between the rotor and the stator is kept stable under the spring action of the flange 9, which contributes to the stable rotation of the ultrasonic motor although the amplitude of the vibration of the stator 6 is usually high and low on the outer and inner diameter sides, respectively.

Figure 5:
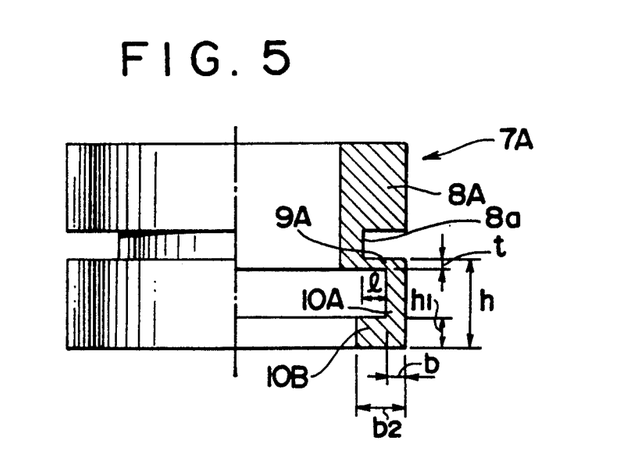
FIG. 5 is a side view, the right half of which is a sectional view, of a rotor, showing a third embodiment of the present invention.

Referring now to FIG. 5, there is shown the main parts of the rotor in a third embodiment of the present invention. The rotor 7A in the third embodiment comprises a rotor main body 8A having a link portion 8a which is formed by machining the outer periphery of the lower part of the thick-walled short cylinder, a thin-walled outward flange which extends integrally from the end face of the link portion 8a on the side of the stator, a vibration portion main body 10A which is cylindrically formed integrally with the outer peripheral edge of the flange 9A and extends in a vibration direction of the travelling wave, and a contact portion 10B which is formed at the end face of the main body 10A on the side of the stator and including a relatively thick-walled inward flange. The vibration portion main body or extension 10A and the contact portion 10B corresponds to a vibration portion 10 in the first embodiment.

The thus formed rotor 7A makes it possible to effectively provide the flange 9A in a limited space since the width of the contact area $b_2$ may be made wider so that $b_2 > b$ wherein $b_2$ represents the thickness of the surface of the vibration portion which is in contact with the stator and b represents the thickness of the vibration main body or extension 10A integral with the flange 9A and the rigidity of the vibration portion is maintained and the width of the link portion 8a and the rotor main body 8A is made narrow.

The rigidity in bending of the vibration portion including the vibration main body or extension 10A and the contact portion 10B is represented as EI wherein E denotes the longitudinal modulus E of the vibration portion and I denote the moment of inertia of area which is determined by the configuration.

$$I = (b_2 e_2^3 - b_1 h_3^3 + b e_1^3)/3$$

wherein $$e_1 = h - e_2$$

$$e_2 = (b_1 h_1^2 + bh)/[2(b_1 h_1 + bh)]$$

$$h_3 = e_2 - h_1$$

h is the parameter which largely contributes to I. The configuration of a rotor having an optimal rigidity may be obtained when $5 < h/t < 15$.

Figure 6:
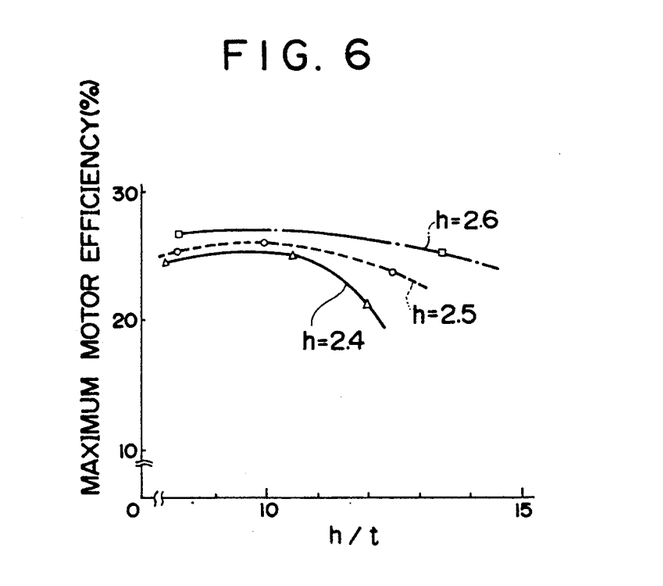
FIGS. 6 and 7 are graphs showing the relation between the maximum efficiency of a motor and the parameters of a rotor.
Figure 7:
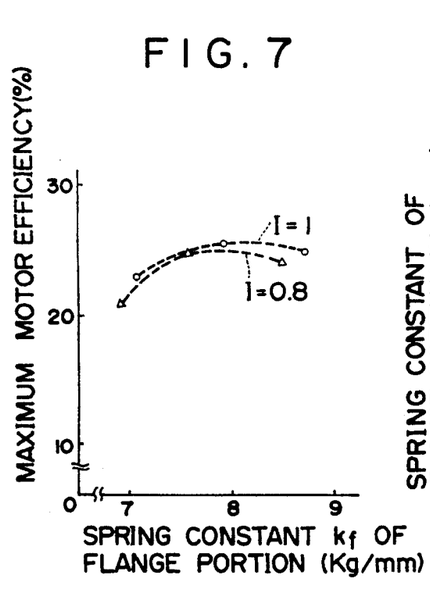

Referring now to FIGS. 6 and 7, there are graphs showing the relation between the rotor configuration and the maximum efficiency of a motor when the configuration of the rotor 7A shown in FIG. 5 changes. FIG. 6 shows a maximum efficiency of a motor in relation to h/t. The efficiency of the motor becomes a maximum approximately when $h/t = 10$. FIG. 7 is a graph showing the relation between the motor efficiency and the spring constant kf of the flange portion 9A. In this case, the motor efficiency becomes maximum approximately when $kf = 8$ kg/mm.

Since $kf \propto EI$ and $kf \propto t^3$, it is t that most contributes to the efficiency in the flange. This means that an optimal value of t exists.

Figure 8:
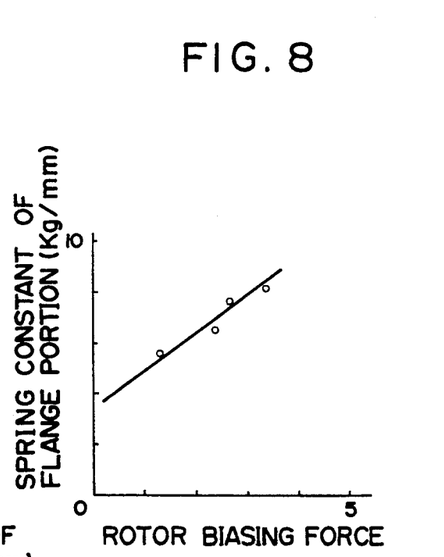
FIG. 8 is a graph showing the relation between the spring constant of the flange and the rotor biasing force which provides a maximum efficiency of the motor.

FIG. 8 is a graph showing the relation between the spring constant of the rotor flange and the rotor biasing force which provides a maximum motor efficiency when the rotor biasing force and the rotor configuration is determined so that a maximum efficiency and stable rotation may be attained for motors having various outputs (starting torque 0.5 kgcm to 2.5 kgcm, outer diameter of the stator 50 mm to 80 mm). It is understood from FIG. 8 that the spring constant of the flange kf (kg/mm) may be represented by a formula as follows:

$$kf = 1.43N + 3.5$$

wherein N(kg) represents the rotor biasing force. Since the driving torque of the motor $T = r \cdot \mu P$ wherein P represents a biasing force, r a mean diameter of the rotor, $\mu$ a friction coefficient of the contact area between the rotor and the stator, the spring constant of the optional flange may be determined by defining the output value of a motor from the graph in FIG. 8. An efficient and stable motor could be obtained if the configuration of the vibration portion is preset optimal to conform to the configuration of the flange. An optimal rotor configuration is such that $t = 0.25$ mm, $h = 2.5$ mm, $b = 1.5$ mm and a motor having a starting torque of 1.8 kgcm and a maximum efficiency of 26% is obtained when a rotor to which a slider of PTFE having a thickness of 0.15 mm is bonded is used together with a stator having an outer diameter of 65 mm and an inner diameter of 58 mm and a resonant frequency of 40 kHz. The output value of the motor is the average of 10 motors.

The best motor shows a starting torque and a maximum efficiency which exceed 2 kgcm and 35%, respectively.

The resonant frequency f of the vibration portion is represented by the following formula:

$$f = 2\pi C \sqrt{I/A} / \lambda^2$$

$\lambda$ represents the wavelength of the travelling wave generated in the stator;

C represents the sound velocity at the vibration portion;

I represents the moment of inertia of area; and

A represents the sectional area of the vibration portion.

In the case of the above-mentioned example, $f = 84$ kHz, which is approximately double the resonant frequency fs (40 kHz), that is $f > fs$. The rotor will not induce an unwanted resonation due to vibration of the stator. Accordingly, a stable rotation of the rotor can be attained. The resonant frequency changes depending upon the configuration of the vibration portion as is apparent from the above-mentioned formula. It is possible to change the sound velocity $$C = \sqrt{E/\rho}$$

(wherein E represents the longitudinal modulus and $\rho$ represents the density) by changing the material of the vibration portion.

Figure 9A:
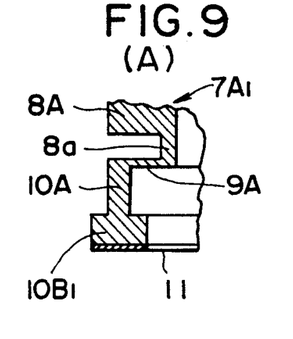
FIGS. 9(A), 9(B) and 9(C) are detailed enlarged sectional views showing the variations of a contact portion and a flange of a rotor.
Figure 9B:
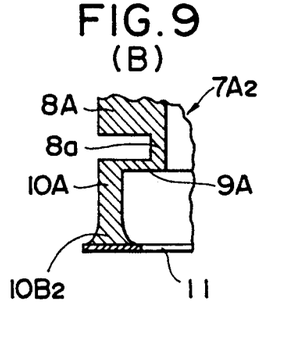
Figure 9C:
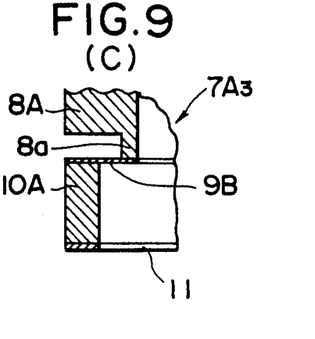

Referring now to FIGS. 9(A), 9(B) and 9(C), there are views showing the variations of the rotor 7A of the present invention. A rotor $7A_1$ in FIG. 9(A) includes a contact portion $10B_1$ (rectangular in section), which is formed symmetrically with respect to the central axis of the vibration portion 10A. The width of the contact portion $10B_1$ may be made wider and a stable motor in which balance against the vibration is excellent is obtained.

A rotor $7A_2$ shown in FIG. 9(B) has such a configuration that the width of the contact portion $10B_2$ (trapizoidal in section) may be made wider and the space for the vibration portion 10A may be a minimum. The rotor $7A_3$ of FIG. 9(C) is integrally formed by assembling a separate flange 9B and a vibration portion 10A. In such a manner, a more compact and highly efficient rotor may be fabricated by changing the configuration as well as the material.

Figure 10:
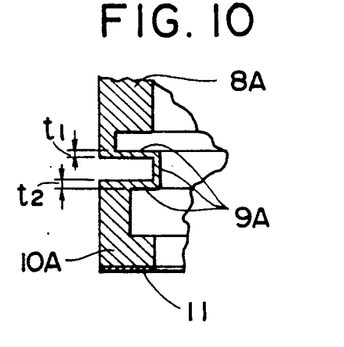
FIG. 10 is a partly sectional view showing another variation of a rotor in which a flange is folded two times.

FIG. 10 shows a variation of a flange in which the flange is folded double. If the number of foldings of the flange is increased, the same spring constant may be assured even by using the flange 9A having thicknesses of $t_1$ and $t_2$ which are larger than that of the flange which is folded once as is shown in FIGS. 1, 4 and 5 and the strength against the breakage of the flange could be increased and deformation of the flange would not occur on fabrication.

Figure 11:
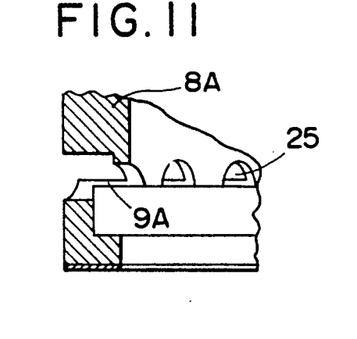
FIGS. 11 and 12 are partly perspective and partly sectional views, respectively showing other variations of a rotor in which the flange is provided with a multiplicity of holes.
Figure 12:
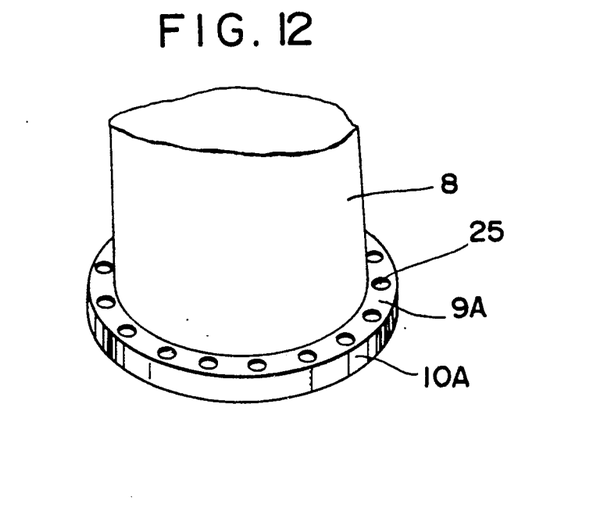

FIG. 11 shows a variation of the rotor in which the flange 9A of the rotor 8A is formed with a large plurality of holes extending in a radial direction. FIG. 12 shows another variation of the rotor in which the flange 9A of the rotor 8A is formed with a large plurality of holes 25 extending in a thrust direction in a spaced manner. The variations of FIGS. 11 and 12 provides the same effect as that of FIG. 10. Although holes are provided in the variations of FIGS. 10 and 11, the same effect may also be obtained by partially thinning the flange instead of providing holes.

Figure 13:
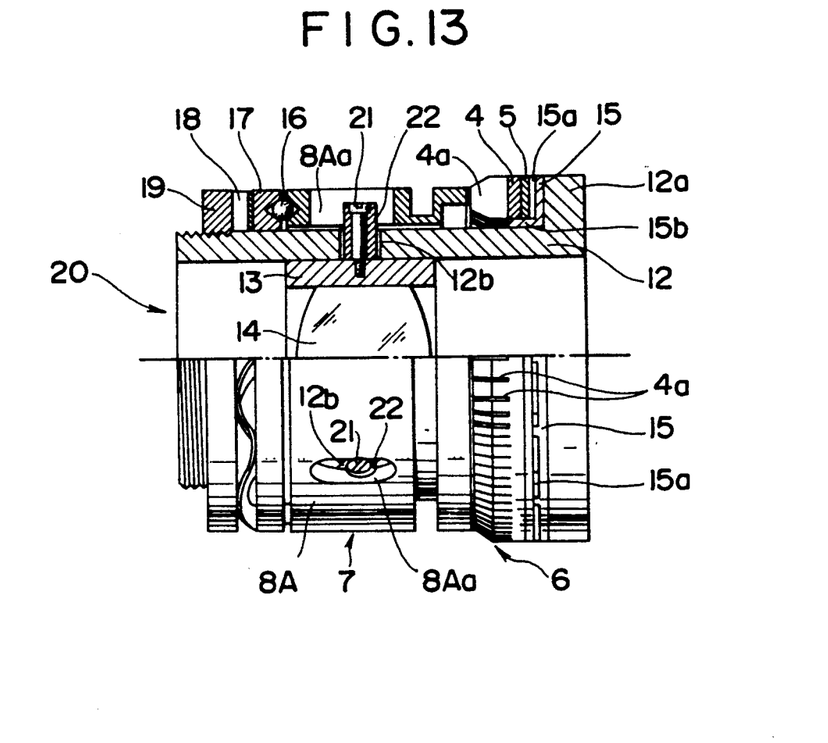
FIG. 13 is a side view, the upper half of which is a sectional view showing an example of a lens-barrel assembly in which an ultrasonic motor of the present invention is incorporated

Referring now to FIG. 13, there is shown a lens-barrel assembly for a camera and the like in which an ultrasonic motor of the present invention is incorporated for driving a lens along an optical axis to determine the distance and etc.

The lens barrel 20 comprises a stationary frame 12 including a cylinder which is relatively thick and has an integral outward flange 12A at the base thereof, a lens frame 13 which is slidably disposed within the stationary frame 12, and a lens 14 such as taking lens supported by the lens frame 13. The ultrasonic motor is incorporated in the lens barrel 20.

A stator 6 comprises an annular stator main body 4 made of an elastic material which is formed with a multiplicity of slits 4a and a piezo-electric ceramics 5 bonded to the main body 4 which is polarized to generate a travelling flexing wave in the main body 4. The stator 6 is supported by a support 15 on the ceramic side. The support 15 is secured to the flange 12a of the stationary frame 12 and has support projections 15a arranged about the periphery thereof in an equally spaced manner. The number of the projections is equal to that of the travelling waves. The stator 6 is also supported at the inner periphery thereof by a receiving ring 15b which extends in an axial direction against radial movement of the stator. The support 15 is made of rubber material and will hardly transmit the vibration of the stator 6 to the stationary frame 12. The rotor 7 which is formed as mentioned above is normally in pressure contact with the surface of the stator main body 4, in which slits 4a are formed by a biasing means. The biasing means comprises a ring ball bearing 17 disposed around the frame 12, balls 18 being disposed between the bearing 17 and the front end of the rotor 7, a ring screw member 19 threadably engaged with the stationary frame 12 and a leaf spring 18 disposed between the screw member 19 and the ring bearing 17. The rotor 7 is held around the stationary frame 12 without being in contact with the frame 12 by means of balls 16 and the biasing force of the rotor 7 applied onto the stator main body 4. This mitigates the friction loss of the motor and increases the efficiency of the motor.

The main body 8A of the rotor 7 is provided at three equally spaced angular positions with three straight guide grooves 8Aa which extend in an axial direction. The stationary frame 12 is formed with three curved cam grooves 12b corresponding to the guide grooves 8Aa for driving the lens 14 in an optical axis direction. A driving pin 21 which is secured to the lens frame 13 extends through each cam groove 12b and guide groove 8Aa. A cylindrical roller 22 is fitted on the driving pin 21.

In the thus formed lens-barrel assembly, a travelling flexing wave is generated at the stator 6 so that the rotor 7 which is in pressure contact with the stator 6 will rotate when high frequency voltages are applied on the piezo-electric ceramics 5. When the rotor 7 rotates, each driving pin 21 and each roller 22 is guided by and along the guide groove 8Aa and is then forwardly or backwardly moved while being rotated around the optical axis. Therefore the lens frame 13 which is integral with the driving pins 21 is forwardly and backwardly moved in an optical axis direction while it is rotated around the optical axis by following the curved cam grooves 12b.

In case of the thus formed lens driving mechanism, even if the lens frame 13 is depressed or pulled in an optical axis direction when the ultrasonic motor is stopped, no force is applied upon the rotor 7, so that the thin-walled flange 9 will never be broken. Application of this lens driving mechanism to an automatic focusing mechanism for a camera makes it possible to perform quiet, high response and fast lens control. Accordingly, an automatic focusing mechanism having a high performance remarkably better than that of the automatic focusing mechanism using a conventional electromagnetic motor may be realized.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. An ultrasonic motor comprising:

an annular stator including an elastic member and piezo-electric elements secured to said elastic member which generates a travelling wave on the surface of the elastic member by being applied with high frequency voltages; and a rotor which is in pressure-contact with the elastic member and is driven to be rotated with respect to said stator by virtue of the travelling wave, said rotor including a cylindrical main body and a flange integrally secured to the periphery of the rotor main body at one end of the main body opposing the stator, and a cylindrical vibration portion secured to an end face of the flange and having a diameter different from that of the rotor main body, said vibration portion extending in a direction which is the same as the vibration direction of the travelling wave, said rotor satisfying the following relation; $5<(h/t)<15$ wherein t designates the thickness of the flange in a direction of the rotational axis, and h designates the height of the vibration portion in a direction of the vibration of the travelling wave.

2. An ultrasonic motor as defined in claim 1 in which said vibration portion comprises an extension portion secured to the flange and a contact portion which is larger in width than said extension portion and is in contact with the stator.

3. An ultrasonic motor as defined in claim 1 in which a slider is secured to the surface of the contact portion of the rotor which is in pressure contact with the stator.

4. An ultrasonic motor as defined in claim 3 in which said slider is made of a sheet of a heat resistant resin in which polytetrafluoroethylene is incorporated in aromatic polyesters, said slider being bonded to the pressure contact surface of the rotor with a polyimide resin.

5. An ultrasonic motor as defined in claim 3 in which said slider has a thickness ranging from 0.1 to 0.3 mm when the pressure contact force of the vibration portion applied on the stator is 0.5 to 5 kg.

6. An ultrasonic motor as defined in claim 3 in which said slider is made of a heat resistant resin having a modulus of compression elasticity of $0.7 \times 10^4$ to $1.3 \times 10^4$ kg/cm$^2$.

7. An ultrasonic motor as defined in claim 6 in which said heat resistant resin is selected from the group consisting of polyimide, polyamide and phenol resins.

8. An ultrasonic motor as defined in claim 1 in which the rotor main body is of reduced thickness on the side where the flange extends by being cut in the vicinity of the flange.

9. An ultrasonic motor as defined in claim 2 in which said contact portion of the rotor is substantially rectangular and trapezoidal in section.

10. An ultrasonic motor as defined in claim 1 in which the flange of the rotor is bent one or more times.

11. An ultrasonic motor comprising:
an annular stator including an elastic member and piezo-electric elements secured to said elastic member which generates a travelling wave on the surface of the elastic member by being applied with high frequency voltages; and
a rotor which is in pressure-contact with the elastic member and is driven to be rotated with respect to said stator by virtue of the travelling wave,
said rotor including a cylindrical main body and a thin flange integrally secured to the periphery of the rotor main body at one end of the main body facing the stator, and a cylindrical vibration portion secured to an end face of the flange and having a diameter different from that of the rotor main body, said vibration portion extending in a direction which is the same as the vibration direction of the travelling wave, said rotor satisfying the following relation, $1 \leq (b/t) \leq 3.5$ wherein t designates the thickness of the flange in a direction of the rotational axis and b designates the width of the vibration portion in a radial direction.

12. An ultrasonic motor as defined in claim 11 in which said vibration portion comprises an extension portion secured to the flange and a contact portion which is larger in width than said extension portion and is in contact with the stator.

13. An ultrasonic motor as defined in claim 11 in which a slider is secured to the surface of the contact portion of the rotor which is in pressure contact with the stator.

14. An ultrasonic motor as defined in claim 13 in which said slider is made of a sheet of a heat resistant resin in which polytetrafluoroethylene is incorporated in aromatic polyesters, said slider being bonded to the pressure contact surface of the rotor with a polyimide resin.

15. An ultrasonic motor as defined in claim 13 in which said slider has a thickness ranging from 0.1 to 0.3 mm when the pressure contact force of the vibration portion applied on the stator is 0.5 to 5 kg.

16. An ultrasonic motor as defined in claim 13 in which said slider is made of a heat resistant resin having a modulus of compression elasticity of $0.7 \times 10^4$ to $1.3 \times 10^4$ kg/cm$^2$.

17. An ultrasonic motor as defined in claim 16 in which said heat resistant resin is selected from the group consisting of polyimide, polyamide and phenol resins.

18. An ultrasonic motor as defined in claim 11 in which the rotor main body is of reduced thickness on the side where the flange extends by being cut in the vicinity of the flange.

19. An ultrasonic motor as defined in claim 12 in which said contact portion of the rotor is substantially rectangular and trapezoidal in section.

20. An ultrasonic motor as defined in claim 11 in which the flange of the rotor is bent one or more times.

21. An ultrasonic motor comprising:
an annular stator including an elastic member and piezo-electric elements secured to said elastic member which generates a travelling wave on the surface of the elastic member by being applied with high frequency voltages; and
a rotor including two cylindrical members having different diameters and a flange which links said two cylindrical members with each other, said rotor being driven to be rotated with respect to the stator by causing one of the two cylindrical members to engage the stator at the one end thereof, the spring constant of the flange of the rotor kf (kg/mm) being represented by the formula $kf = 1.43N + 3.5$ wherein N (kg) represents a biasing force of the rotor applied upon the stator.

22. An ultrasonic motor as defined in claim 21 in which the portion of the cylinder which is in contact with the stator is wider than the portion of the cylinder secured to the flange.

23. An ultrasonic motor comprising:
an annular stator including an elastic member and piezo-electric elements secured to said elastic member which generates a travelling wave on the surface of the elastic member by being applied with high frequency voltages; and
a rotor which is in pressure contact with the surface of the elastic member and is driven to be rotated with respect to the stator by the travelling wave, said rotor comprising a cylindrical main body, a thin-walled flange integrally secured to the periphery of the main body at an end face thereof facing the stator, said flange being formed with a plurality of holes arranged in an spaced manner about said flange, and a cylindrical vibration portion integrally secured to the end face of the flange, which extends in a direction of vibration of the travelling wave.

24. An ultrasonic motor comprising:
an annular stator including an elastic member and piezo-electric elements secured to said elastic member which generates a travelling wave on the surface of the elastic member by being applied with high frequency voltages; and
a rotor which is in pressure-contact with the elastic member and is driven to be rotated with respect to said stator by virtue of the travelling wave,
said rotor including a cylindrical main body and a flange integrally secured to the periphery of the rotor main body at one end of the main body opposing the stator, and a cylindrical vibration portion secured to an end face of the flange and having a diameter different from that of the rotor main body, said vibration portion extending in a direction which is the same as the vibration direction of the travelling wave, said rotor satisfying the following relation: $5 < (h/t) < 15$ wherein t designates the thickness of the flange and h designates the height of the vibration portion in a direction of the vibration of the travelling wave.

25. An ultrasonic motor as defined in claim 24 in which the diameter of said vibration portion is greater than the diameter of the main body.

26. An ultrasonic motor as defined in claim 24 wherein said flange has at least one folded portion.

* * * * *

UNITED STATES PATENT AND TRADEMARK OFFICE
CERTIFICATE OF CORRECTION

PATENT NO. : 5,028,833
DATED : July 2, 1991
INVENTOR(S) : Sumio Kawai It is certified that error appears in the above-identified patent and that said Letters Patent is hereby corrected as shown below:

```
Column 1, line 55, after "contribute" insert --to--

Column 3, line 16, change "an" to --a--

Column 3, lines 67-68, change "efficiently" to
     --efficiency--

Column 4, line 8, change "shoWing" to --showing--

Column 4, line 38, before "lower" insert -- ( --

Column 4, line 48, change "body B" to --body 8--

Column 5, line 9, change "dumping" to --dampening--

Column 5, line 34, before "less" insert --not--

Column 7, line 10, change "denote" to --denotes--

Column 12, line 36, change "an" to --a--
```

Signed and Sealed this

Ninth Day of March, 1993

*Attest:*

STEPHEN G. KUNIN

*Attesting Officer*    *Acting Commissioner of Patents and Trademarks*